(12) United States Patent
Zhang et al.

(10) Patent No.: US 12,224,861 B2
(45) Date of Patent: Feb. 11, 2025

(54) CONTROL SIGNALING FOR PUCCH RELIABILITY ENHANCEMENT

(71) Applicant: Apple Inc., Cupertino, CA (US)

(72) Inventors: Yushu Zhang, Beijing (CN); Wei Zeng, San Diego, CA (US); Dawei Zhang, Saratoga, CA (US); Haitong Sun, Irvine, CA (US); Weidong Yang, San Diego, CA (US); Sigen Ye, Whitehouse Station, NJ (US); Jie Cui, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 17/442,021

(22) PCT Filed: May 15, 2020

(86) PCT No.: PCT/CN2020/090574
§ 371 (c)(1),
(2) Date: Sep. 22, 2021

(87) PCT Pub. No.: WO2021/227033
PCT Pub. Date: Nov. 18, 2021

(65) Prior Publication Data
US 2022/0303054 A1 Sep. 22, 2022

(51) Int. Cl.
*H04L 1/08* (2006.01)
*H04W 72/044* (2023.01)
(Continued)

(52) U.S. Cl.
CPC ............. *H04L 1/08* (2013.01); *H04W 72/046* (2013.01); *H04W 72/21* (2023.01); *H04W 72/23* (2023.01)

(58) Field of Classification Search
CPC ........ H04L 1/08; H04W 72/21; H04W 72/23; H04W 72/046
(Continued)

(56) References Cited

U.S. PATENT DOCUMENTS

| | | | |
|---|---|---|---|
| 2020/0205150 A1* | 6/2020 | Cheng | H04W 72/21 |
| 2021/0203397 A1* | 7/2021 | Xiong | H04W 72/046 |

(Continued)

FOREIGN PATENT DOCUMENTS

| | | |
|---|---|---|
| CN | 110521265 A | 11/2019 |
| WO | 2019195180 A1 | 10/2019 |

(Continued)

OTHER PUBLICATIONS

International Search Report for PCT Patent Application No. PCT/CN2020/090574; mailed Jan. 27, 2021.

*Primary Examiner* — Nicholas R Taylor
*Assistant Examiner* — Chong G Kim
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to perform PUCCH repetition based on signaling from at least one base station. The UE may connect to at least one base station. The UE may receive signaling from the at least one base station configuring physical uplink control channel (PUCCH) transmission. The signaling may indicate a plurality of PUCCH resources for PUCCH repetition. The signaling may indicate a plurality of beams for PUCCH repetition. Based on the signaling from the at least one base station, the UE may transmit the PUCCH a plurality of times using the plurality of PUCCH resources and the plurality of beams.

17 Claims, 12 Drawing Sheets

(51) Int. Cl.
*H04W 72/21* (2023.01)
*H04W 72/23* (2023.01)

(58) Field of Classification Search
USPC .......................................................... 370/329
See application file for complete search history.

(56) References Cited

U.S. PATENT DOCUMENTS

| | | |
|---|---|---|
| 2021/0282167 A1* | 9/2021 | Wang .................... H04L 5/0044 |
| 2022/0287054 A1* | 9/2022 | Kim .................... H04W 72/569 |
| 2023/0023719 A1* | 1/2023 | Ji .......................... H04W 16/28 |
| 2023/0076897 A1* | 3/2023 | Svedman .............. H04W 72/23 |
| 2023/0171611 A1* | 6/2023 | Matsumura ............ H04B 7/088 |
| | | 370/329 |
| 2023/0209509 A1* | 6/2023 | Khoshnevisan .. H04W 72/0446 |
| | | 370/329 |

FOREIGN PATENT DOCUMENTS

| | | |
|---|---|---|
| WO | 2020011109 A1 | 1/2020 |
| WO | 2020032617 A1 | 2/2020 |

* cited by examiner

```
PUCCH-CSI-Resource-r17 ::=      SEQUENCE {
    uplinkBandwidthPartID       BWP-Id,
    pucch-Resource              SEQUENCE (SIZE(1..maxNrofPucchCsiResource) of PUCCH-ResourceId)
}

SchedulingRequestResourceConfig ::=  Sequence {
    schedulingRequestResourceId      SchedulingRequestResourceId,
    schedulingRequestID              SchedulingRequestId,
    ...
    resource                         SEQUENCE (SIZE(1..maxNrofPucchResourceForSr) of PUCCH-ResourceId)
}
```

FIG. 9

CONTROL SIGNALING FOR PUCCH RELIABILITY ENHANCEMENT

Priority Claim Information

This application is a U.S. National Stage application of International Application No. PCT/CN2020/090574, filed May 15, 2020, titled "Control Signaling for PUCCH Reliability Enhancement", which is hereby incorporated by reference in its entirety.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

Increased reliability in these communication systems are desirable.

SUMMARY

Embodiments are presented herein of apparatuses, systems, and methods for a user equipment device (UE) to perform PUCCH repetition based on signaling from at least one base station.

The UE may connect to at least one base station. The UE may receive signaling from the at least one base station configuring physical uplink control channel (PUCCH) transmission. The signaling may indicate a plurality of PUCCH resources for PUCCH repetition. The signaling may indicate a plurality of beams for PUCCH repetition. Based on the signaling from the at least one base station, the UE may transmit the PUCCH a plurality of times using the plurality of PUCCH resources and the plurality of beams.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIG. 9 illustrates an exemplary PUCCH resource configuration, according to some embodiments;

Figure 1:
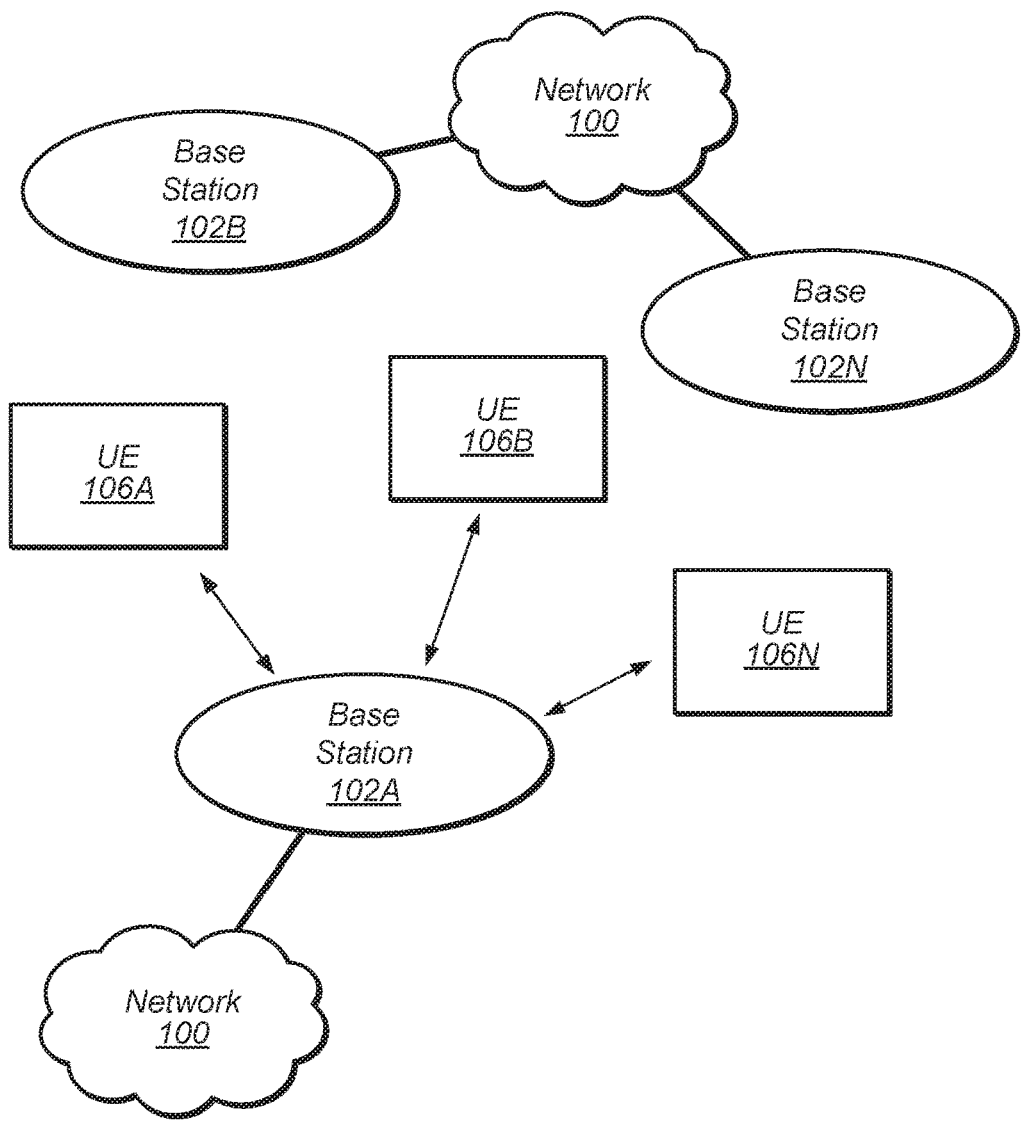
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
  BS: Base Station
  ENB: eNodeB (Base Station)
LTE: Long Term Evolution
  UMTS: Universal Mobile Telecommunications System
RAT: Radio Access Technology
  RAN: Radio Access Network
  E-UTRAN: Evolved UMTS Terrestrial RAN
CN: Core Network
  EPC: Evolved Packet Core
MME: Mobile Management Entity
  HSS: Home Subscriber Server
SGW: Serving Gateway
  PS: Packet-Switched
CS: Circuit-Switched
  EPS: Evolved Packet-Switched System
RRC: Radio Resource Control
  IE: Information Element
QoS: Quality of Service
  QoE: Quality of Experience
TFT: Traffic Flow Template
  RSVP: Resource ReSerVation Protocol
  API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
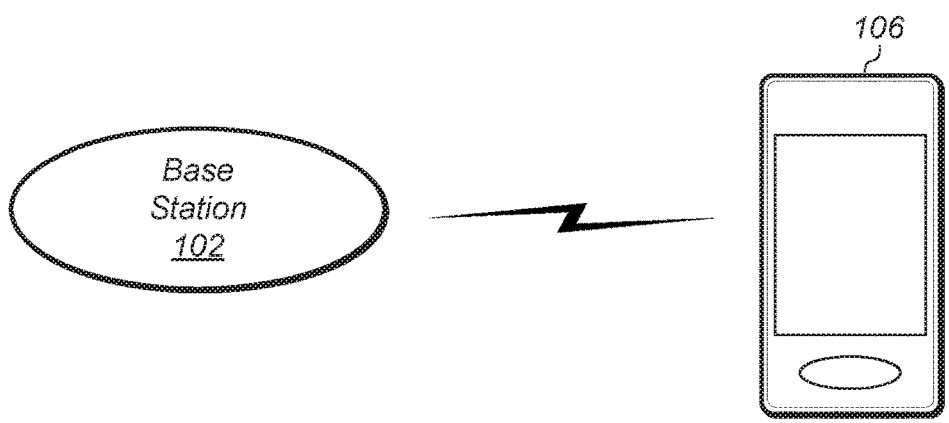
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
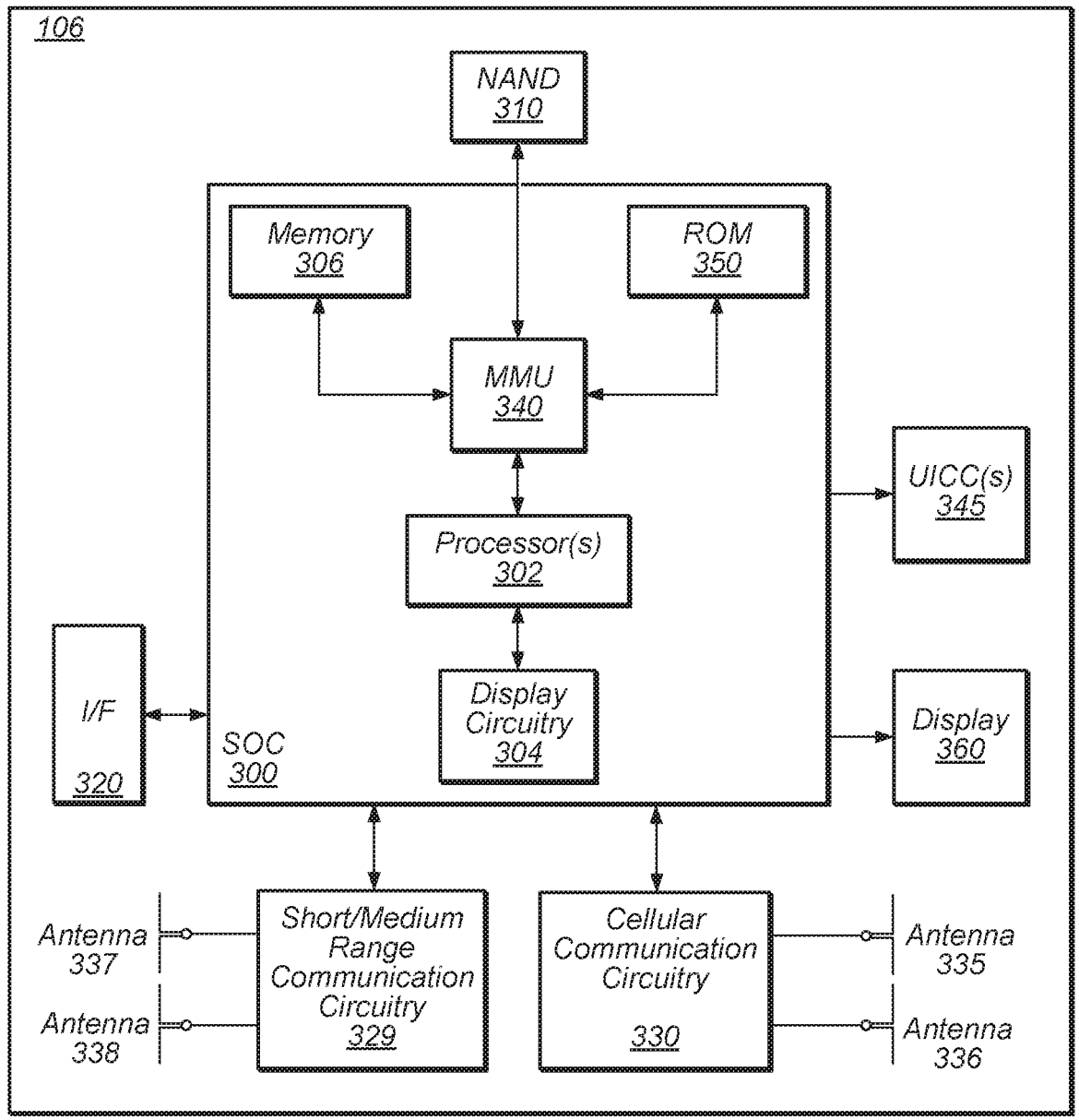
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
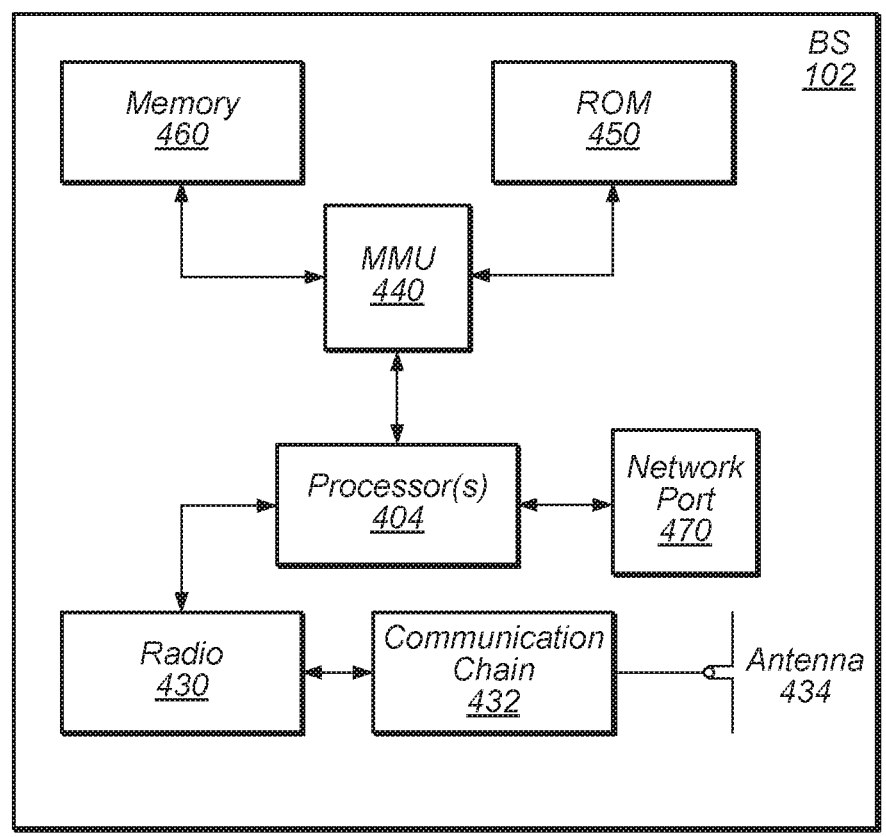
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
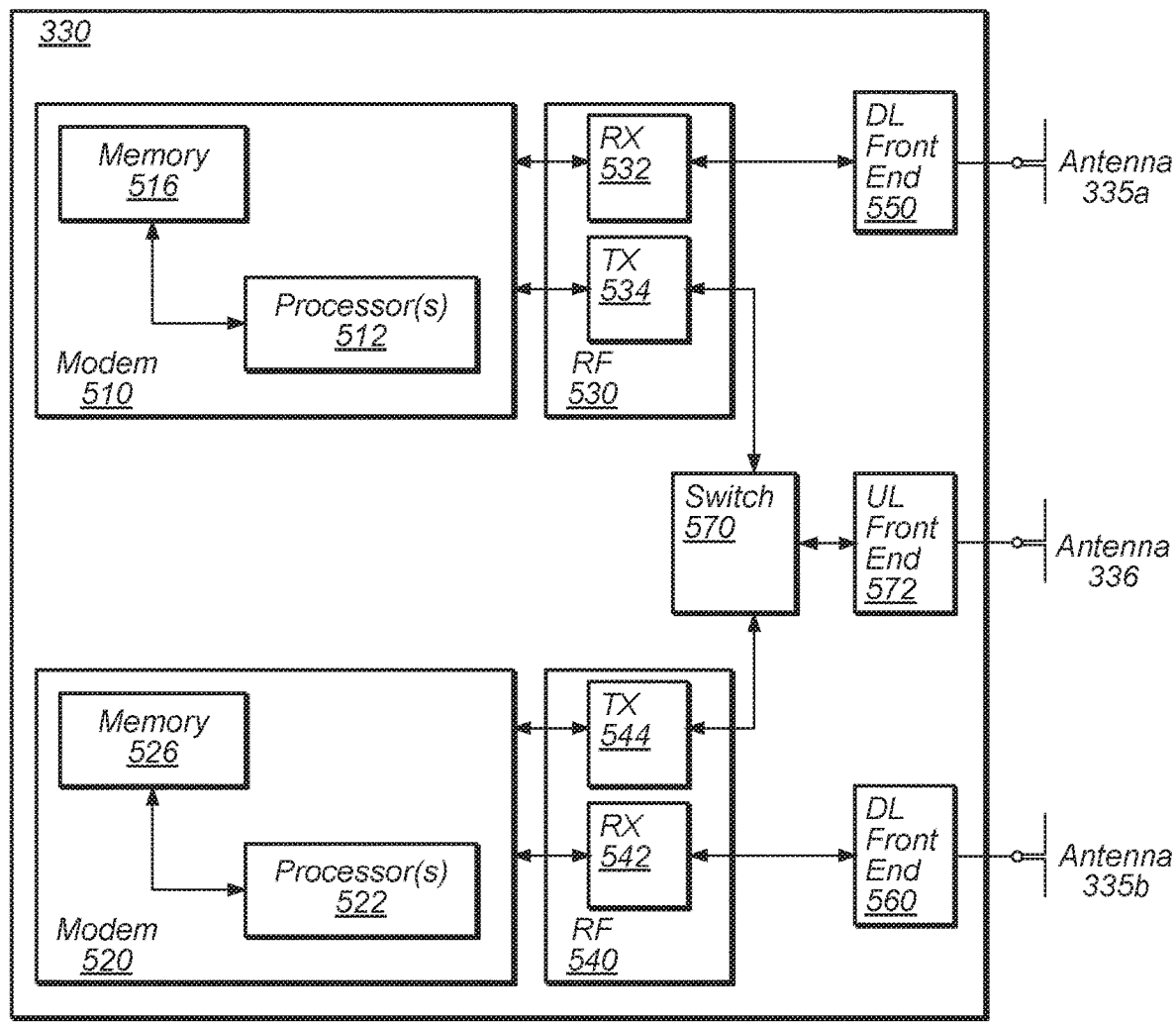
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
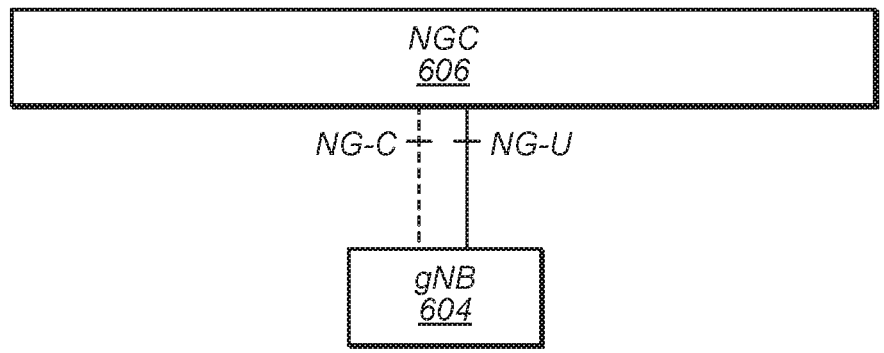
FIGS. 6 and 7 illustrate examples of a 5G NR base station (gNB), according to some embodiments.
Figure 7:
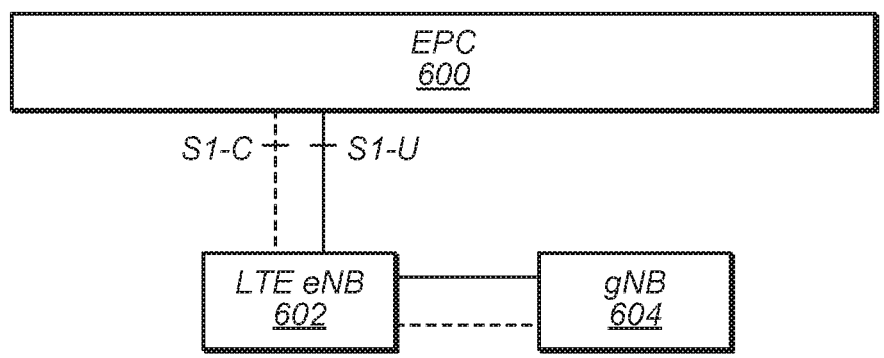

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
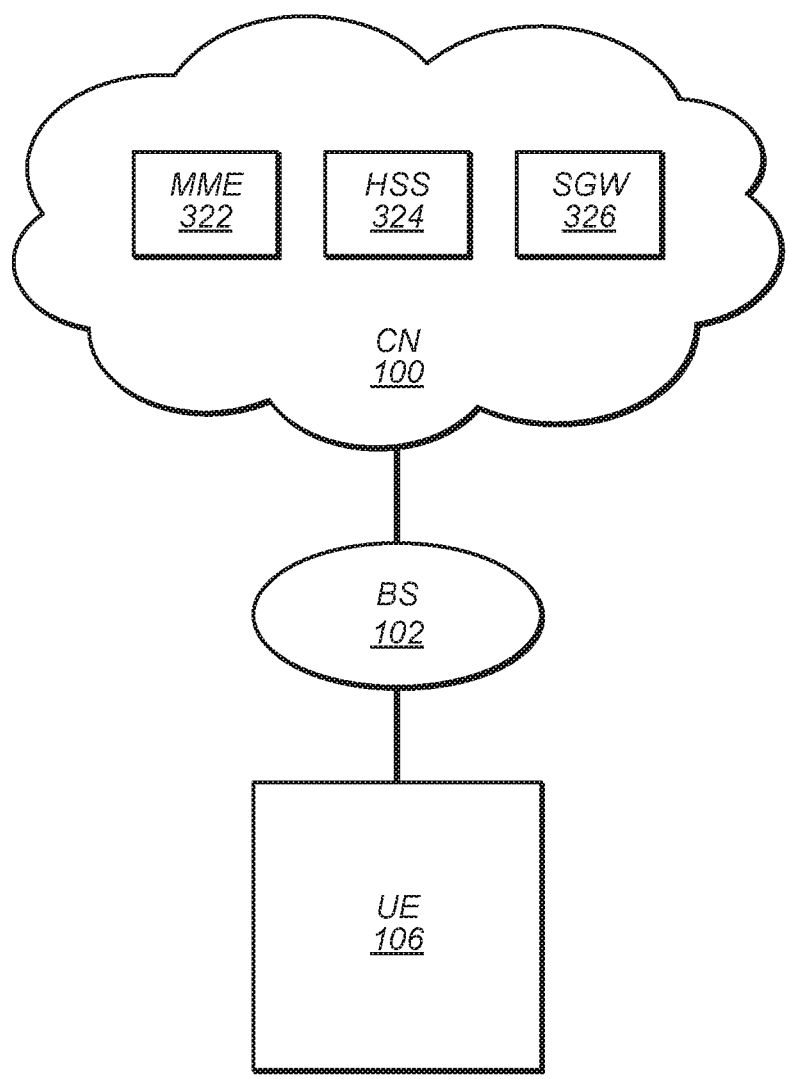
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MIME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

PUCCH Reliability Enhancement

In some embodiments, a base station (e.g., a gNB) can indicate spatial relation information on a per PUCCH resource basis or on a per PUCCH resource group basis. For example, a base station may configure one spatial information for a PUCCH resource, e.g., using RRC signaling.

A PUCCH resource can be used to carry uplink control information (UCI), including HARQ-ACK, Channel State Information (CSI), and/or scheduling request (SR), among other possibilities. CSI may include any of the following: CRI, SSBRI, RI, PMI, CRI, LI, L1-RSRP, L1-SINR, etc.

In some embodiments, the UE may use the beam indicated by the spatial relation information for the PUCCH transmission. Alternatively, the base station may configure multiple spatial relation information for a PUCCH resource, e.g., using RRC signaling. Accordingly, the base station may use additional signaling (e.g., MAC CE) to activate one of the spatial relation info for the PUCCH resource. The UE may then use the activated beam for the PUCCH transmission.

To improve robustness and reliability for PUCCH transmission, in some embodiments, the PUCCH may be transmitted repeatedly, e.g., using multiple beams. However, there are multiple ways to multiplex the PUCCH repetitions, provide signaling to indicate the beams for each PUCCH repetition, and/or deal with collisions between PUCCH and PUSCH transmissions.

In some embodiments, the PUCCH repetitions may be multiplexed according to a variety of schemes. For example, the PUCCH repetitions may be multiplexed using time division multiplexing (TDM). In this case, the PUCCH repetitions may be multiplexed within a slot or across multiple slots, which could be configured in a predefined manner or may be configured by higher layer signaling. Additionally, the offset between each repetition could also be predefined or configured by higher layer signaling.

In some embodiments, the PUCCH repetitions may be multiplexed according to frequency division multiplexing (FDM). In this case, different starting physical resource blocks (PRBs) can be configured for different repetitions. The time domain duration and/or time domain DMRS pattern could be the same or different, as desired.

In some embodiments, the PUCCH repetitions may be multiplexed according to spatial division multiplexing (SDM). In this case, different scramble ID can be configured for different repetitions.

According to various embodiments, the multiplexing scheme and/or number of repetitions for one PUCCH transmission occasion may be configured by higher layer signaling, e.g. RRC or MAC CE, and/or DCI.

For repeated PUCCH transmission, a UCI report can be carried by multiple PUCCH resources. Additionally, more than one spatial relation or transmission and configuration indication (TCI) states can be configured for a PUCCH resource or PUCCH resource group.

In some embodiments, for periodic/semi-persistent CSI reports or scheduling requests, more than one PUCCH resource can be configured by RRC. In one example, the RRC signaling may be configured according to the messages shown in FIG. 9. In some embodiments, the PUCCH resources should be configured with the same format. In the examples shown, each PUCCH CSI resource may be configured by including the uplinkBandwidthPartID as well as the pucch-Resource (which may include a sequence). The resource configuration may include the schedulingRequestResourceID, the schedulingRequestID; and resource (e.g., which may include a sequence). There may be a configuration (e.g., PUCCH CSI resource shown in FIG. 9) for each resource indicated in the configuration (e.g., the resource configuration shown in FIG. 9).

In some embodiments, for aperiodic PUCCH, e.g., which may be triggered by PDCCH, more than one PUCCH resources can be indicated by higher layer signaling, e.g. RRC or MAC CE, and/or DCI signaling. Additionally, or alternatively, additional PUCCH resource indicator(s) can be introduced in DCI. For example, the PUCCH resource for the other PUCCH repetition(s) can be determined by the additional PUCCH resource indicator(s) and/or control channel element (CCE) index value(s).

Alternatively, or additionally, the PUCCH resource indicator, e.g., in DCI, can be mapped to more than one PUCCH resource. For example, the mapping between PUCCH resource indicator and PUCCH resource(s) can be configured by higher layer signaling or predefined, as desired. As another possibility, the PUCCH resource(s) can be determined by the CCE index.

In some embodiments, the slot offset for each PUCCH resource may be configured by higher layer signaling and/or DCI.

Figure 10:
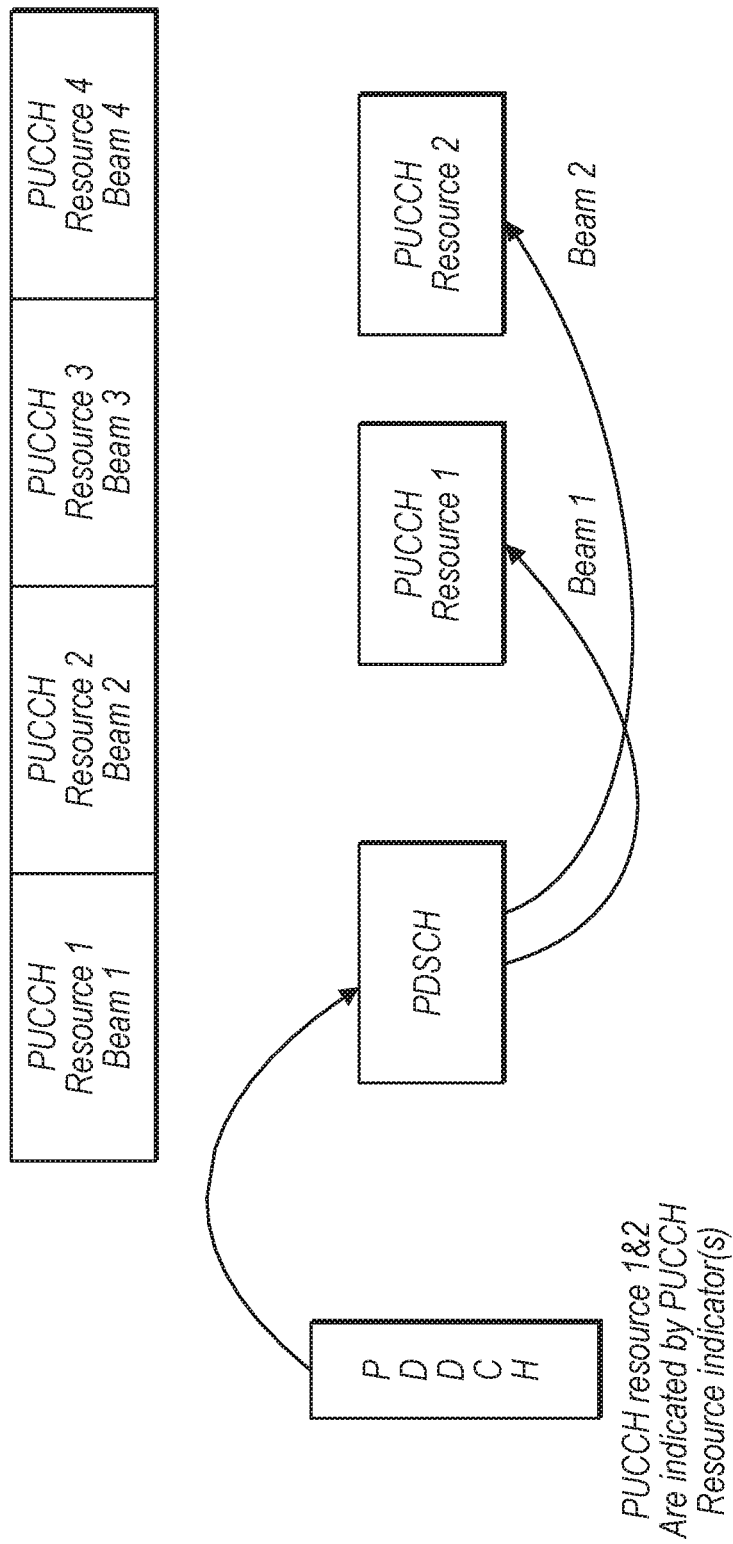
FIG. 10 illustrates an exemplary PUCCH repetition for an acknowledgement, across two beams.

FIG. 10 provides an example for aperiodic PUCCH repetition (e.g., for acknowledgements). In the example of FIG. 10, the PDCCH indicates resources 1 and 2 via PUCCH resource indicators. Data is then transmitted via the PDSCH. Accordingly, the UE may use PUCCH resource 1 in beam 1 and PUCCH resource 2 in beam 2 to transmit an acknowledgement (which is repeated over two beams).

In some embodiments, signaling (e.g., MAC CE) can activate more than one spatial relation or TCI states for a PUCCH resource or for a group of PUCCH resources. For example, spatial relation or TCI state(s) activated, e.g., by MAC CE, may be selected based on those configured by higher layer signaling, e.g., RRC signaling. In one embodiment, the number of PUCCH repetitions can be determined by the number of spatial relation or TCI states activated and/or indicated by the signaling, e.g., by MAC CE.

In one embodiment, the uplink power control parameters could be derived based on the parameters associated with one of the spatial relation or TCI states. Alternatively, or additionally, the uplink power control for each PUCCH repetition may be performed independently, e.g., based on the power control parameters associated with each spatial relation or TCI state.

When more than one spatial relation or TCI state is activated for PUCCH, e.g., with lowest resource ID, various embodiments may be used. For example, for PUSCH, e.g., scheduled by DCI Format 0_0, one of the spatial relation or TCI states for the PUCCH may be used to determine PUSCH beam. In one embodiment, the spatial relation or TCI states with lowest or highest ID may be used to determine PUSCH beam. In one embodiment, the first or last spatial relation or TCI state (e.g., indicated in MAC CE) may be used to determine PUSCH beam. In one embodiment, the index of spatial relation or TCI state to determine PUSCH beam may be configured by higher layer signaling and/or DCI. For example, the CCE index of the PDCCH may be used to determine this index.

Figure 11:
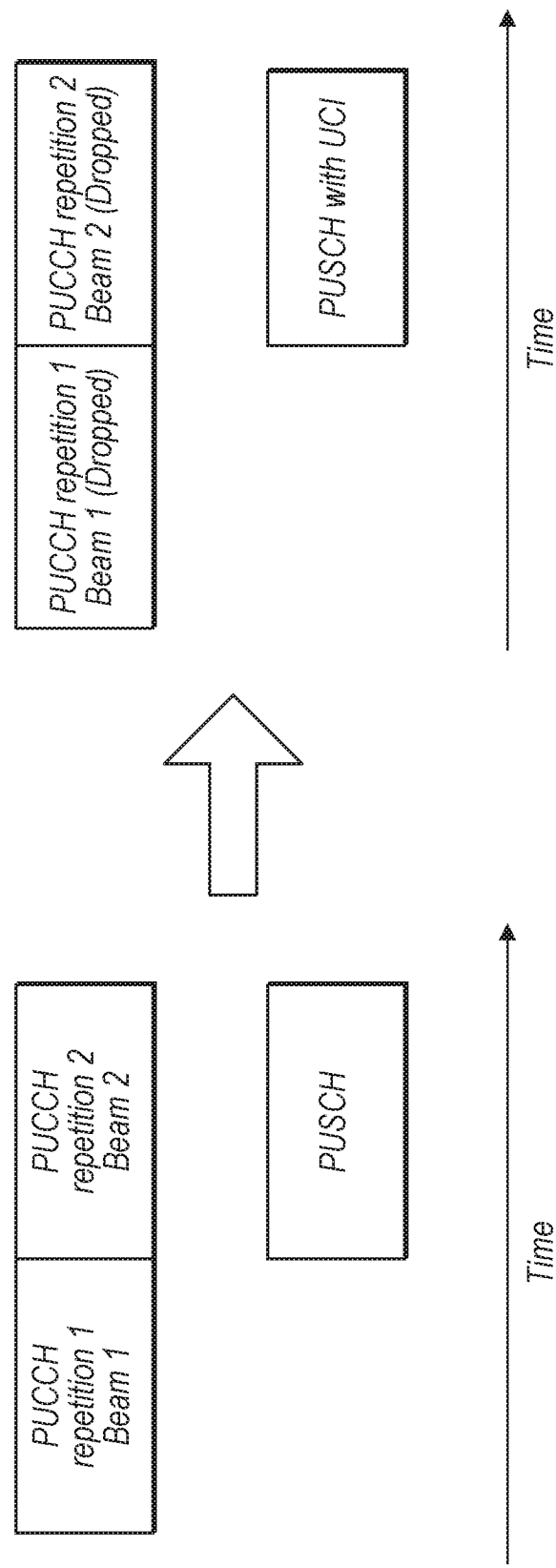
FIGS. 11-13 illustrate examples of PUCCH and PUSCH collision resolution, according to some embodiments.
Figure 12:
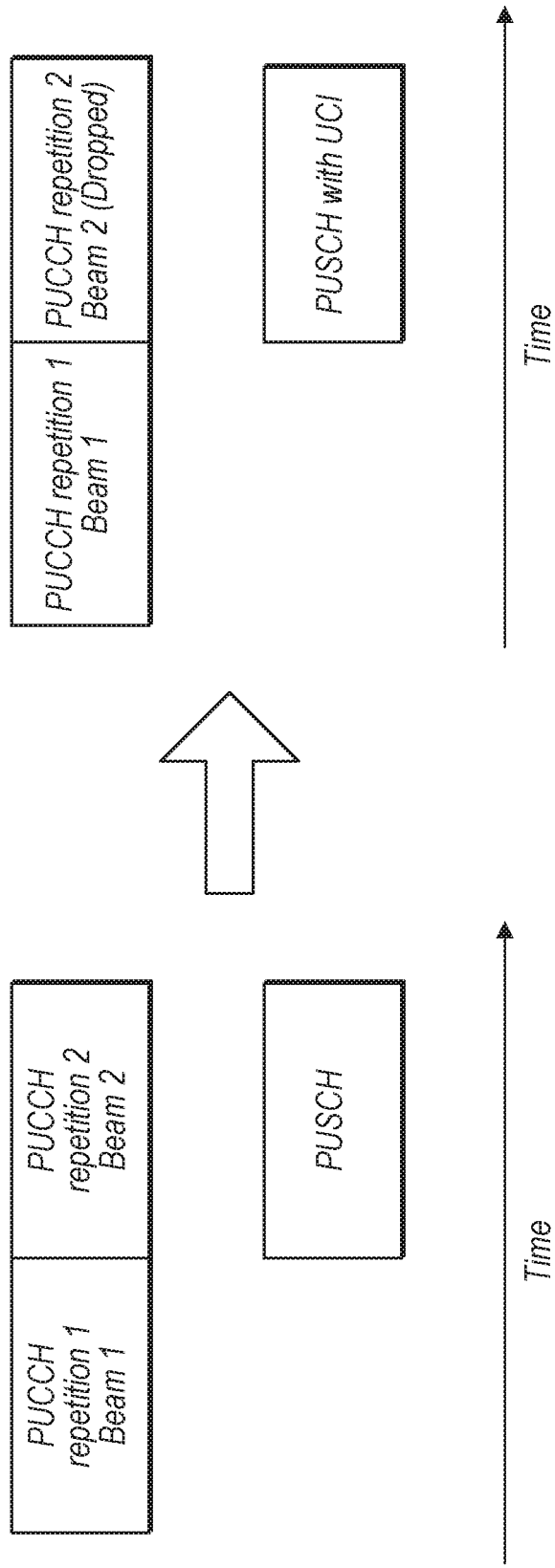
Figure 13:
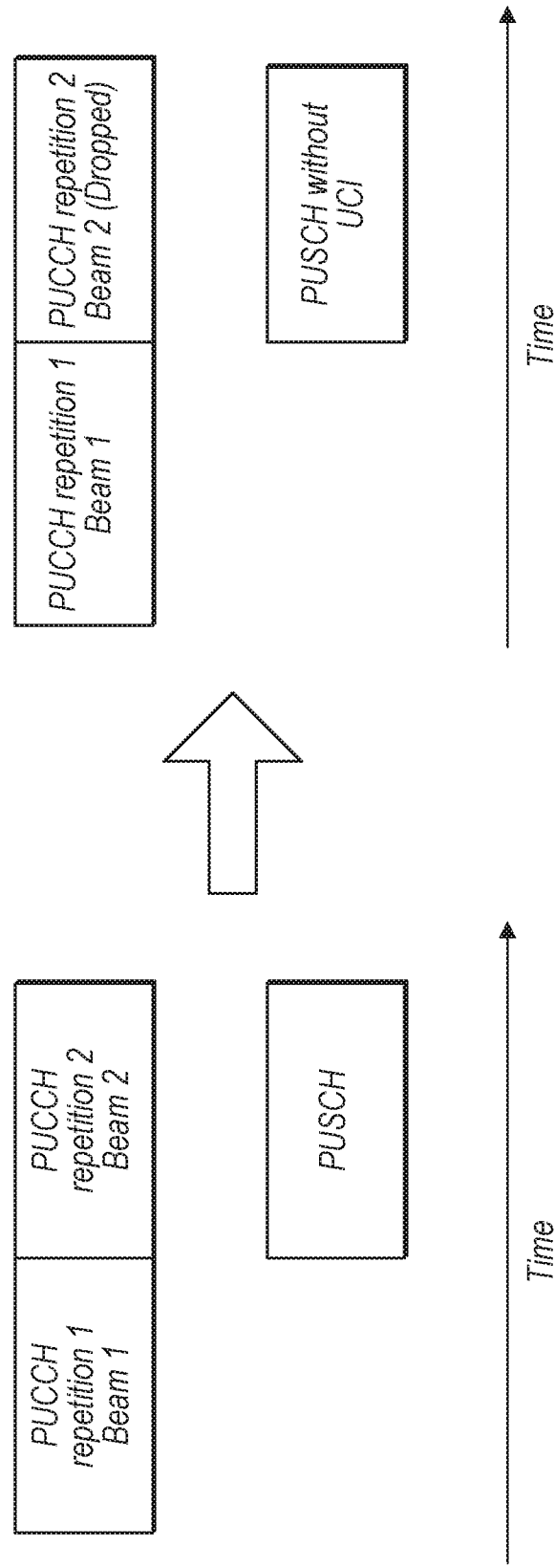

When one of or a subset of the PUCCH repetition collides with PUSCH, any of various embodiments may be used. In the example of FIG. 11, all the PUCCH repetitions may be dropped, and the UCI may be carried by PUSCH. In the example of FIG. 12, the overlapped PUCCH repetition(s) may be dropped, and the UCI may be carried by PUSCH. In the example of FIG. 13, the overlapped PUCCH repetition(s) may be dropped, and the UCI may not be carried by PUSCH.

Figure 14:
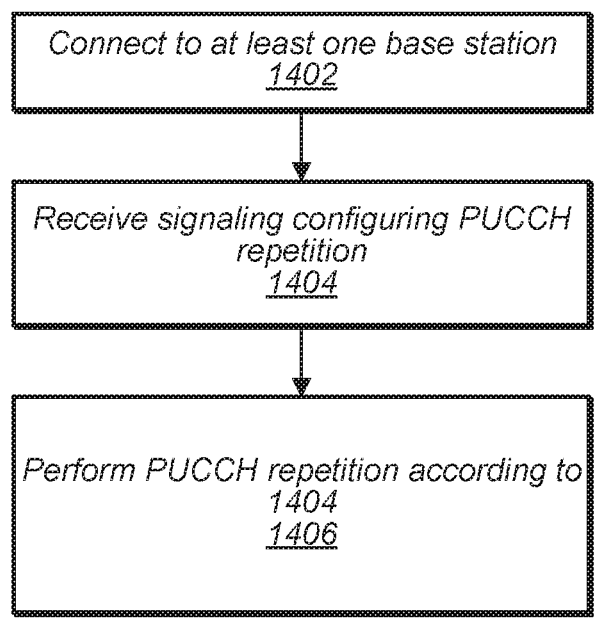
FIG. 14 is a flow chart diagram illustrating an example method for PUCCH control signaling, according to some embodiments.

FIG. 14—PUCCH Repetition

FIG. 14 illustrates exemplary techniques for PUCCH repetition. Aspects of the method of FIG. 14 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1402, a UE 106 may establish communication with a network 100, according to some embodiments. The communication may occur via any number of TRPs, e.g., any number of BS 102. It will be appreciated that multiple TRPs may be controlled or coordinated by a single network element of network 100 (e.g., an element of a core network 606 or 600, or of a radio access network (RAN)). For example, one TRP may be a macro cell while another TRP may be a small cell. One or more TRP may operate according to any of various wireless standards and/or use any combination of frequency resources. For example, one TRP may be associated with licensed access and another TRP may be associated with unlicensed access. The UE may be configured to receive PDCCH or PDSCH from one or a plurality of base stations or TRPs in the following steps.

In 1404, the UE may receive signaling from the at least one base station configuring physical uplink control channel (PUCCH) repetition. For example, the signaling may configure a plurality of PUCCH resources for PUCCH repetition. Additionally, or alternatively, the signaling may indicate a plurality of TCI states or beams for performing the PUCCH repetition.

The signaling may be performed in any of various manners. For example, higher layer signaling (e.g., RRC or MAC signaling) may be used to indicate at least some of the plurality of PUCCH resources. Additionally, or alternatively, PUCCH resources may be indicated using DCI (e.g., within PDCCH). In general, any combination of initial higher layer signaling (e.g., RRC and/or MAC signaling) and later signaling (e.g., DCI) may be used to indicate the plurality of PUCCH resources and/or the plurality of beams. For example, an initial one or more PUCCH resources may be specified by higher layer signaling and DCI may activate additional resources. Additionally, or alternatively, the DCI may select a subset of the pool of PUCCH resources for the PUCCH repetition. Thus, the signaling of 1404 may be done at a single time or may be provided over a span of time, using multiple different messages and/or communications. For example, the higher layer signaling may occur at a first time, and lower layer (or physical layer) signaling may occur at a later time, the combination of which specifies the PUCCH resources and/or beam configuration (or TCI states), as desired.

In some embodiments, the signaling may include initial higher layer signaling specifying the plurality of PUCCH resources. The signaling may further include media access control (MAC) signaling indicating the plurality of beams. In some embodiments, the number of repetitions of PUCCH is based on the number of indicated beams, although it may be specified in any desired manner (e.g., separately from the number of indicated beams). In some embodiments, the signaling may include DCI, e.g., within PDCCH, indicating at least one PUCCH resource of the plurality of PUCCH resources.

In one embodiment, the signaling may include higher layer signaling (e.g., RRC and/or MAC signaling) indicating at least a first PUCCH resource, and the signaling may further include downlink control information (DCI) indicating at least one additional PUCCH resource at a later time.

In some embodiments, the signaling includes media access control (MAC) signaling indicating a respective PUCCH resource for each of the plurality of beams. For example, the MAC signaling (or any type of signaling) may indicate which beam uses which PUCCH resource, or generally, the correspondence between PUCCH resources and desired beams, as desired.

The signaling may also indicate a transmission scheme for the PUCCH repetitions. For example, the PUCCH repetitions may be repeated in a time manner (e.g., TDM), where repetition occurs within a slot or across multiple slots (e.g., sequential slots), as desired. The offset could be specified by the signaling above (e.g., higher layer signaling) and/or may be predefined, as desired. In general, any of the present possible configurations may be predefined, signaled by higher layer signaling (e.g., RRC and/or MAC signaling), and/or signaled by lower layer signaling (e.g., DCI).

Similarly, PUCCH repetition may be repeated according to frequency, e.g., FDM. Different starting physical resource blocks (PRBs) may be configured for different repetitions. Additionally, the time domain duration and/or time domain DMRS pattern could be the same. The PUCCH repletion may also be repeated according to SDM, e.g., where different scramble IDs can be configured for different repetitions. Thus, the multiplexing scheme and/or number of repetitions for a PUCCH transmission occasion may be configured by higher layer signaling (e.g., RRC and/or MAC signaling), lower layer signaling (e.g., DCI), and/or predefined.

In 1406, based on the signaling from the at least one base station in 1404, the UE transmit the PUCCH a plurality of times. For example, the UE may transmit the same PUCCH (repeat transmission) using the plurality of PUCCH resources and/or over the plurality of beams.

The PUCCH may include any of a variety of desired information, e.g., uplink control information (UCI), acknowledgements/negative acknowledgements (e.g., HARQ-ACK), channel state information (CSI), scheduling requests (SR), and/or any desired uplink information.

In some cases, at least one of the PUCCH repetitions may be in conflict with a PUSCH transmission. If possible, the UE may be able to transmit both at the same time. However, in some UE configurations, this may not be possible (e.g., based on available transmission chains of the UE). Accordingly, the UE may have to resolve the conflict. In one embodiment, the UE may drop at least the conflicted PUCCH repetition based on the conflict, and instead transmit the PUSCH for during the time slot for the conflicted PUCCH. The UE may drop (not transmit) both repetitions during a conflict, even if the PUSCH only conflicts with one of them, although this is not required. In either case, the PUSCH may be modified to include at least some of the information that was to be transmitted in the PUCCH, e.g., the UCI information, although it may be delayed to a later PUCCH transmission, if desired (e.g., based on the urgency of the information to be transmitted).

EXEMPLARY EMBODIMENTS

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

The following paragraphs provide example embodiments.

In some embodiments, an apparatus includes: one or more processors, wherein the one or more processors are configured to cause a user equipment (UE) to: connect to at least one base station; receive signaling from the at least one base station configuring physical uplink control channel (PUCCH) transmission, wherein the signaling configures a plurality of PUCCH resources for PUCCH repetition; and based on the signaling from the at least one base station, transmit the PUCCH a plurality of times using the plurality of PUCCH resources, wherein said transmitting is performed using a plurality of beams.

In some embodiments, the signaling further indicates the plurality of beams.

In some embodiments, the signaling includes initial higher layer signaling specifying the plurality of PUCCH resources, and the signaling further includes media access control (MAC) signaling indicating the plurality of beams.

In some embodiments, the number of repetitions of PUCCH is based on the number of indicated beams.

In some embodiments, the signaling includes downlink control information (DCI) indicating at least one PUCCH resource of the plurality of PUCCH resources.

In some embodiments, the signaling includes higher layer signaling indicating a first PUCCH resource, the signaling further includes downlink control information (DCI) indicating at least one additional PUCCH resource at a later time, and the plurality of PUCCH resources include the first PUCCH resource and the at least one additional PUCCH resource.

In some embodiments, the one or more processors are further configured to: determine a first PUCCH repetition is in conflict with a physical uplink shared channel (PUSCH) transmission; and drop at least the first PUCCH repetition based on the conflict.

In some embodiments, the PUCCH includes uplink control information (UCI), and the one or more processors are further configured to: transmit the UCI in the PUSCH transmission based on said dropping at least the first PUCCH repetition.

In some embodiments, a user equipment device (UE) includes: wireless communication circuitry; and one or more processors coupled to the wireless communication circuitry, wherein the one or more processors are configured to cause a user equipment (UE) to: connect to at least one base station; receive signaling from the at least one base station configuring physical uplink control channel (PUCCH) transmission, wherein the signaling indicates a plurality of transmission and configuration indication (TCI) states for PUCCH repetition; and transmit the PUCCH a plurality of times using a plurality of beams based on the plurality of TCI states.

In some embodiments, the signaling further indicates a plurality of PUCCH resources, wherein said transmitting the PUCCH a plurality of times uses the plurality of PUCCH resources.

In some embodiments, the signaling includes initial higher layer signaling specifying the plurality of PUCCH resources, wherein the signaling further includes media access control (MAC) signaling indicating the plurality of TCI states.

In some embodiments, the number of repetitions of PUCCH is based on the number of indicated TCI states.

In some embodiments, the signaling includes downlink control information (DCI) indicating at least one PUCCH resource of the plurality of PUCCH resources.

In some embodiments, the signaling includes higher layer signaling indicating a first PUCCH resource, and wherein the signaling further includes downlink control information (DCI) indicating at least one additional PUCCH resource at a later time.

In some embodiments, the one or more processors are further configured to: determine a first PUCCH repetition is in conflict with a physical uplink shared channel (PUSCH) transmission; and drop at least the first PUCCH repetition based on the conflict.

In some embodiments, the PUCCH includes uplink control information (UCI), and the one or more processors are further configured to: transmit the UCI in the PUSCH transmission based on said dropping at least the first PUCCH repetition.

In some embodiments, a method for operating a user equipment (UE), includes: by the UE: connecting to at least one base station; receiving at least one message from the at least one base station configuring physical uplink control channel (PUCCH) transmission, wherein the at least one message indicates a plurality of PUCCH resources, wherein the at least one message indicates a plurality of beams, wherein the at least one message configures the UE to perform PUCCH repetition using the plurality of PUCCH resources and the plurality of beams; based on the at least one message, transmitting a first PUCCH transmission using a first PUCCH resource and a first beam; and based on the at least one message, transmitting a second PUCCH transmission using a second PUCCH resource and a second beam, wherein the second PUCCH transmission is a repetition of the first PUCCH transmission.

In some embodiments, the at least one message includes a first one or more radio resource control (RRC) messages specifying at least one of the plurality of PUCCH resources.

In some embodiments, the at least one message includes downlink control information (DCI) specifying at least one PUCCH resource for the PUCCH transmission.

In some embodiments, the at least one message includes media access control (MAC) signaling indicating a respective PUCCH resource for each of the plurality of beams.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
wireless communication circuitry; and
one or more processors coupled to the wireless communication circuitry, wherein the one or more processors are configured to cause the UE to:
    connect to at least one base station;
    receive a configuration from the at least one base station configuring physical uplink control channel (PUCCH) resource, wherein the configuration indicates PUCCH transmission repetitions, and wherein a plurality of spatial relations are configured for the PUCCH transmissions repetitions;
    receive a media access control (MAC) control element (CE) activating more than one spatial relation of the plurality of spatial relations for the PUCCH resource; and
    transmit the PUCCH transmission repetitions on the PUCCH resource using the plurality of spatial relations, wherein a respective PUCCH repetition is transmitted using one of the plurality of spatial relations and the repetitions are space division multiplexed within a slot.

2. The UE of claim 1, wherein MAC CE indicates activation of the plurality of spatial relations for the PUCCH resource.

3. The UE of claim 1, wherein the one or more processors are further configured to cause the UE to:
perform power control for a respective PUCCH transmission based on power control parameters for the one of the plurality of spatial relations.

4. The UE of claim 3, wherein power control is performed independently for respective spatial relations of the plurality of spatial relations.

5. The UE of claim 1, wherein a number of repetitions of PUCCH is based on a number of the plurality of spatial relations.

6. The UE of claim 1, wherein the configuration configures multiple PUCCH resources, and wherein downlink control information (DCI) indicated at least one of the multiple PUCCH resources.

7. The UE of claim 1, wherein the one or more processors are further configured to cause the UE to:
   determine a first PUCCH repetition is in conflict with a physical uplink shared channel (PUSCH) transmission; and
   drop at least the first PUCCH repetition based on the conflict.

8. A processor configured to:
   connect to at least one base station;
   receive a configuration from the at least one base station configuring physical uplink control channel (PUCCH) resource, wherein the configuration indicates PUCCH transmission repetitions, and wherein a plurality of spatial relations are configured for the PUCCH transmissions repetitions;
   receive a media access control (MAC) control element (CE) activating more than one spatial relation of the plurality of spatial relations for the PUCCH resource; and
   transmit the PUCCH transmission repetitions on the PUCCH resource using the plurality of spatial relations, wherein a respective PUCCH repetition is transmitted using one of the plurality of spatial relations and the repetitions are space division multiplexed within a slot.

9. The processor of claim 8, wherein a MAC CE indicates activation of the plurality of spatial relations for the PUCCH resource.

10. The processor of claim 8, further configured to:
   perform power control for a respective PUCCH transmission based on power control parameters for the one of the plurality of spatial relations.

11. The processor of claim 10, wherein power control is performed independently for respective spatial relations of the plurality of spatial relations.

12. The processor of claim 8, wherein a number of repetitions of PUCCH is based on a number of the plurality of spatial relations.

13. A method, comprising:
   connecting to at least one base station;
   receiving a configuration from the at least one base station configuring physical uplink control channel (PUCCH) resource, wherein the configuration indicates PUCCH transmission repetitions, and wherein a plurality of spatial relations are configured for the PUCCH transmissions repetitions;
   receiving a media access control (MAC) control element (CE) activating more than one spatial relation of the plurality of spatial relations for the PUCCH resource; and
   transmitting the PUCCH transmission repetitions on the PUCCH resource using the plurality of spatial relations, wherein a respective PUCCH repetition is transmitted using one of the plurality of spatial relations and the repetitions are space division multiplexed within a slot.

14. The method of claim 13, wherein a MAC CE indicates activation of the plurality of spatial relations for the PUCCH resource.

15. The method of claim 13, further comprising:
   performing power control for a respective PUCCH transmission based on power control parameters for the one of the plurality of spatial relations.

16. The method of claim 15, wherein power control is performed independently for respective spatial relations of the plurality of spatial relations.

17. The method of claim 13, wherein a number of repetitions of PUCCH is based on a number of the plurality of spatial relations.

* * * * *